(12) United States Patent
Joo (10) Patent No.: US 8,005,717 B2
(45) Date of Patent: Aug. 23, 2011

(54) INTERNET ADVERTISING METHOD AND SYSTEM USING WEB PAGE

(76) Inventor: Jin Yong Joo, Seon gnam-si (KR)

( * ) Notice: Subject to any disclaimer, the term of this patent is extended or adjusted under 35 U.S.C. 154(b) by 1500 days.

(21) Appl. No.: 11/363,099

(22) Filed: Feb. 28, 2006

(65) Prior Publication Data

US 2006/0206380 A1    Sep. 14, 2006

(30) Foreign Application Priority Data

Mar. 12, 2005 (KR) .................. 10-2005-0020799

(51) Int. Cl.
*G06Q 30/00* (2006.01)
*G05B 19/418* (2006.01)
(52) U.S. Cl. .................. 705/14.73; 715/205; 705/1
(58) Field of Classification Search .............. 705/14, 705/1; 715/205
See application file for complete search history.

(56) References Cited

U.S. PATENT DOCUMENTS

| 7,386,473 | B2 * | 6/2008 | Blumenau | 705/26 |
| 7,523,387 | B1 * | 4/2009 | Greenwald et al. | 715/205 |
| 2001/0039497 | A1 * | 11/2001 | Hubbard | 705/1 |
| 2002/0103822 | A1 * | 8/2002 | Miller | 707/501.1 |
| 2002/0133397 | A1 * | 9/2002 | Wilkins | 705/14 |
| 2005/0132305 | A1 * | 6/2005 | Guichard et al. | 715/855 |
| 2006/0111971 | A1 * | 5/2006 | Salesin et al. | 705/14 |

OTHER PUBLICATIONS

Web publishing power to the people. ( Strategies for . . . Digital Publishing ). Information Today , v 21 , n 8 , p. S6. Sep. 2004.*

* cited by examiner

*Primary Examiner* — John G. Weiss
*Assistant Examiner* — Victoria Vanderhorst
(74) *Attorney, Agent, or Firm* — Lowe Hauptman Ham & Berner LLP (57) ABSTRACT

An Internet advertising method using a Web page according to the present invention is performed between a Web server and a client terminal in the Internet. The Internet advertising method includes an advertisement location searching step of searching in a Web page transmitted from the Web server to the client terminal for a location into which new advertising content is to be inserted, a space information identification step of identifying a size and coordinates of a found location, an advertising content searching step of searching for new advertising content corresponding to the identified location size and coordinates, and a Web page editing step of inserting found new advertising content into the location.

23 Claims, 8 Drawing Sheets

INTERNET ADVERTISING METHOD AND SYSTEM USING WEB PAGE

BACKGROUND OF THE INVENTION

1. Field of the Invention

The present invention relates to an Internet advertising method and system, which provide the advertisements of enterprises to a plurality of clients in an Internet environment in which the clients can access a server for providing online services through terminals capable of performing Internet communication, and exchange data with the server.

2. Description of the Related Art

The development of Internet communication networks has produced new advertising media using the Internet. In particular, as main consumers ranging from teenagers to persons in their thirties, who are the main targets of advertisements, have been concentrating on Internet communications, the Internet has evolved into an advertising medium exceeding newspapers or broadcasting, which had been the conventional advertising media.

Generally, an advertising scheme using Internet communications as an advertising medium is operated so that a banner advertisement or an image advertisement is displayed on a Web page such as a portal site and/or an electronic commerce site for providing email service, search service or electronic commerce service, respectively, and the client can access the server of an advertiser linked to a corresponding advertisement if the client clicks the advertisement.

Therefore, the client using the Internet must compulsorily view a banner advertisement or an image advertisement so as to be provided with the above-described Internet service.

Meanwhile, such a conventional advertising scheme is limited in that, since a corresponding Web page is uniformly transmitted to client terminals after advertising content and images have been fixedly arranged in advance using Hyper-Text Markup Language (HTML), the advertising content is always arranged at the same location, so it is difficult to attract the attention of the client who frequently accesses the corresponding Web page. Further, the reason for the client to access a specific Web site over the Internet is to use the service provided by the corresponding Web site. Accordingly, it is undesirable that the area occupied by the service information provided by the Web page is smaller than that of advertising content in view of the purpose of the client to use the service.

As a result, space capable of accommodating advertising content is limited, and such limitation becomes the cause of instigating competition between advertisers for occupying a specific location on a Web page, thus increasing advertisement costs.

Meanwhile, recently, as the number of Web sites for providing various types of Internet services or electronic commerce sites has excessively increased, there is a tendency that Internet users have concentrated on specific Web sites due to the qualitative difference in the content contained on the various Web sites. Therefore, as advertisers then also concentrate on these specific sites, advertising orders have greatly decreased in unpopular sites having a relatively low viewing rate. Consequently, such a tendency also instigates competition between advertisers, thus increasing advertisement costs.

Moreover, since the conventional advertising scheme using the Internet uniformly provides only the same advertisement regardless of the residential district, age or preferences of Internet users, local advertisements or target advertisements, which have been widely conducted by local newspapers or local broadcasting, cannot be applied to Internet advertisements, thus exhibiting limitations in advertising effectiveness.

SUMMARY OF THE INVENTION

Accordingly, the present invention has been made keeping in mind the above problems occurring in the prior art, and an object of the present invention is to provide an Internet advertising method and system in which an advertiser can efficiently provide advertisements to clients, that is, Internet users, and the clients can remarkably reduce inconvenience caused by advertisements while sufficiently enjoying services provided by a corresponding Web page.

In order to accomplish the above object, the present invention provides an Internet advertising method using a Web page, the advertising method being performed between a Web server and a client terminal in the Internet, comprising an advertisement location searching step of searching a Web page transmitted from the Web server to the client terminal for a location into which new advertising content is to be inserted; a space information identification step of identifying a size and coordinates of a found location; an advertising content searching step of searching for new advertising content corresponding to the identified location size and coordinates; and a Web page editing step of inserting found new advertising content into the location.

Further, the present invention provides an Internet advertising system using a Web page, the advertising system including a terminal connected to a Web server through the Internet to relay Internet communication of a client, comprising a location search module for searching a Web page to be displayed through the terminal for a location into which new advertising content is to be inserted; an identification module for identifying size and coordinates of a location found by the location search module; an advertising content database (DB) for storing new advertising content; and an editing module for analyzing the size and coordinates of the location obtained by the identification module, searching the advertising content DB for new advertising content corresponding to the analyzed location size and coordinates, and inserting found new advertising content into the Web page.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
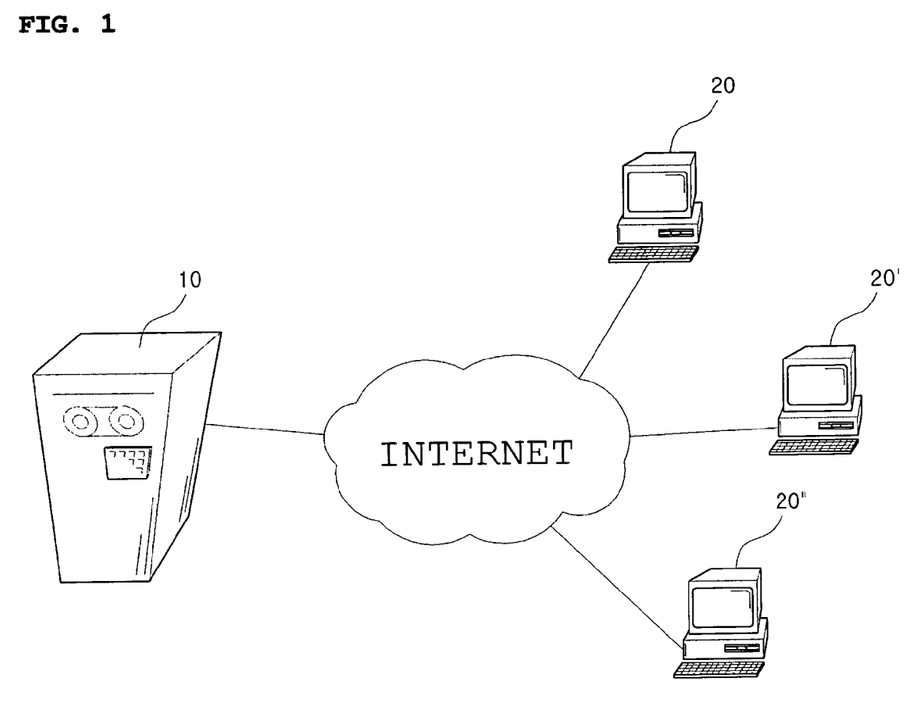
FIG. 1 is a diagram showing an Internet environment implemented according to the present invention.
Figure 2:
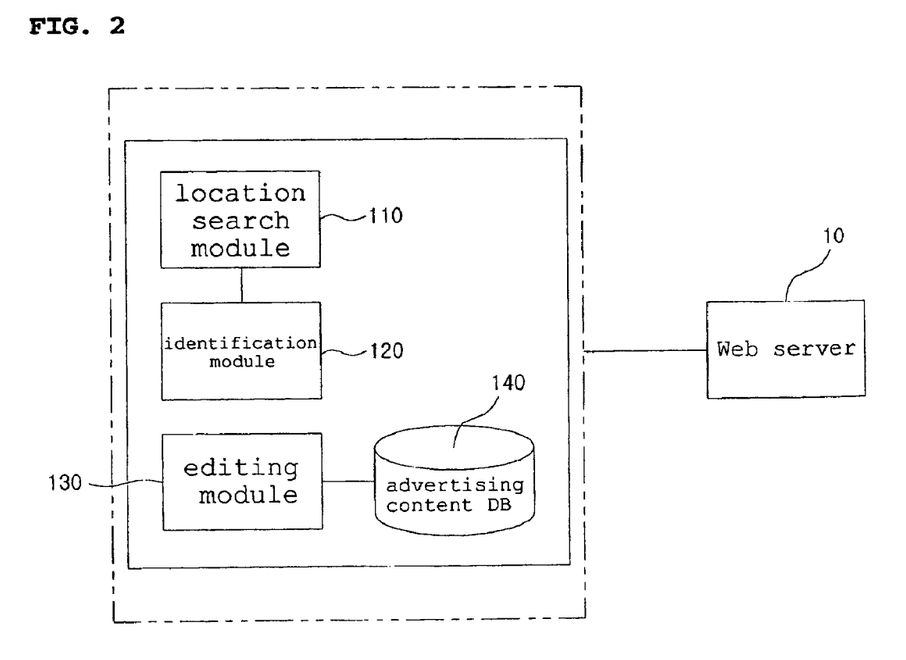
FIG. 2 is a block diagram of an advertising system according to a first embodiment of the present invention.

FIG. 1 is a diagram showing an Internet environment implemented according to the present invention, and FIG. 2 is a block diagram of an advertising system according to a first embodiment of the present invention. With reference to FIGS. 1 and 2, the advertising system is described.

As shown in FIG. 1, the advertising system of the present invention is installed in a client terminal 20 provided with various types of content so that the advertising system is connected to a Web server 10 through the Internet. That is, after normally receiving information data from the Web server 10, the advertising system edits the information data and provides required advertising content to a client before a corresponding Web page is displayed via a Web browser installed in the terminal. Therefore, respective client terminals 20, 20' and 20" can provide various advertising content depending on the age and preferences of a client (in detail, Internet users, or netizens) instead of displaying uniform advertising content received from the Web server 10.

For this operation, in the Internet advertising system including the terminals 20, 20' and 20" connected to the Web server 10 through the Internet to relay the Internet communication of clients, the advertising system of the present invention includes a location search module 110 for searching a Web page to be displayed on the terminals 20, 20' and 20" for the location into which new advertising content is to be inserted, an identification module 120 for identifying the size and coordinates of a corresponding location found by the location search module 110, an advertising content database (DB) 140 for storing new advertising content and an editing module 130 for analyzing the size and coordinates of the location obtained by the identification module 120, searching the advertising content DB 140 for new advertising content corresponding to the analyzed location size and coordinates, and inserting the found new advertising content into the Web page to be displayed.

In order to search for a space in which the new advertising content stored in the advertising content DB 140 is to be placed, the location search module 110 reads a data source transmitted from the Web server 10 to determine the location into which the new advertising content is to be inserted when the Web browser operates the data source and creates a Web page to be displayed on the terminal 20 based on the definition of HTML. Generally, as the space into which new advertising content can be inserted, a text region occupying a certain part of a Web page, an advertising content region, a Graphical User Interface (GUI) region of the Web browser, an empty region, etc. can be used. In the advertising system and method according to the present invention, all of the exemplified regions can be utilized as the space into which new advertising content can be inserted. A detailed technical description required to utilize each exemplified region is described below.

The identification module 120 identifies the size and coordinates of the space found by the location search module 110. The data source received from the Web server 10 includes information about the coordinates of locations at which advertising content, text, etc. is to be aligned, sizes indicating the areas of the advertising content and text occupying a corresponding Web page, etc. On the basis of the data source, the Web browser of the terminal 20 completes the Web page to be displayed. The identification module 120 can read the source code, and operate the size and coordinates of the empty region, the size and coordinates of the advertising content region, the size and coordinates of the GUI region, etc.

If information about the sizes and coordinates of the empty region, the advertising content region, and the GUI region, which are identified by the identification module 120, has been transmitted, the editing module 130 searches the advertising content DB 140 for new advertising content corresponding to the size and coordinates, and inserts the found new advertising content into the Web page being created by the Web browser.

An advertising method according to the present invention is performed based on the above-described construction.

Figure 8:
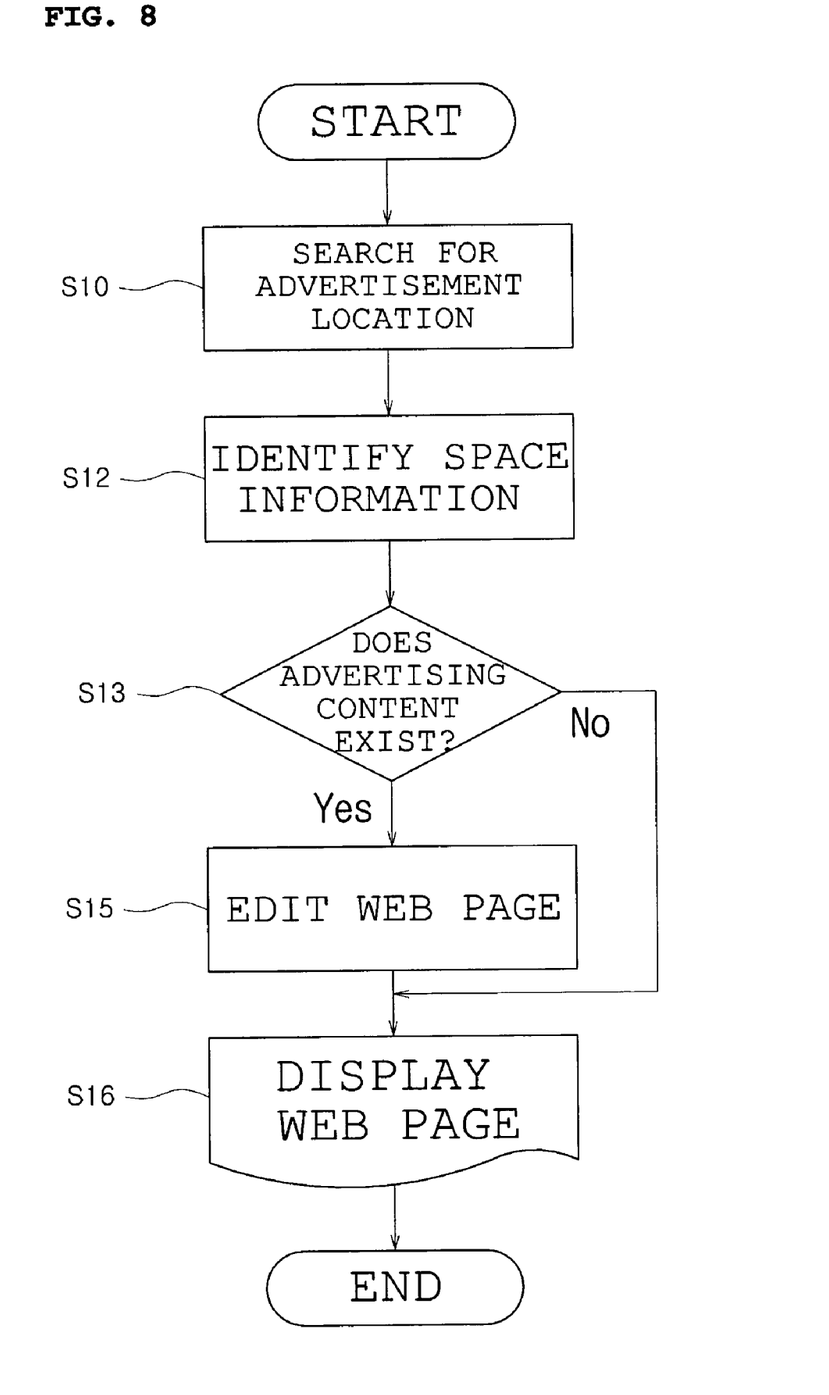
FIG. 8 is a flowchart of an advertising method according to a first embodiment of the present invention.

FIG. 8 is a flowchart of an advertising method according to a first embodiment of the present invention. The advertising method is described with reference to FIG. 8.

(1) Advertisement location searching step S10 of searching the Web page, transmitted from the Web server 10 and to be displayed on the terminal 20, for a location into which new advertising content can be inserted The location search module 110 reads the source data transmitted from the Web server 10 and searches for the location into which new advertising content is to be inserted. If there is no limitation, any location on the Web page can be used as the advertisement insertion location, but it is preferable that locations that may cause Internet users to be inconvenienced in using unique content provided by the Web server 10 be excluded.

(2) Space information identification step S12 of identifying the size and coordinates of a corresponding location if the location has been found In order to search the advertising content DB 140 for new advertising content to be inserted into the found location, the identification module 120 reads the source data transmitted from the Web server 10 and identifies the size and coordinates of the corresponding location.

Generally, in order to complete a Web page, the size of a location must correspond to the size of content to be inserted into that location. However, in the case of the advertising system according to the present invention, a Web page provided by the Web server cannot be predicted by the terminals 20, 20' and 20". Accordingly, if new advertising content corresponding to the size of a space of a corresponding location does not exist in the advertising content DB 140, even though the location search module 110 finds the space into which the new advertising content can be inserted, the new advertising content cannot be inserted. Therefore, the advertising content DB 140 preferably stores advertising content data having various sizes for the same advertising content.

(3) Advertising content searching step S13 of searching for advertising content applicable to the size and coordinates of the location The editing module 130 searches the advertising content DB 140 for required new advertising content, based on the information about the size and coordinates of the space, transmitted from the identification module 120. As a result of the search, if no new advertising content having a size corresponding to the space exists, any data required to edit a Web page is not loaded.

(4) Web page editing step S15 of inserting found advertising content into the location If suitable new advertising content is found as a result of the search for advertising content DB 140 by the editing module 130, the editing module 130 loads the new advertising content, and inserts the new advertising content into a Web page before the Web browser completes and displays the corresponding Web page, thus displaying the Web page including the new advertising content through the terminal 20.

Figure 3:
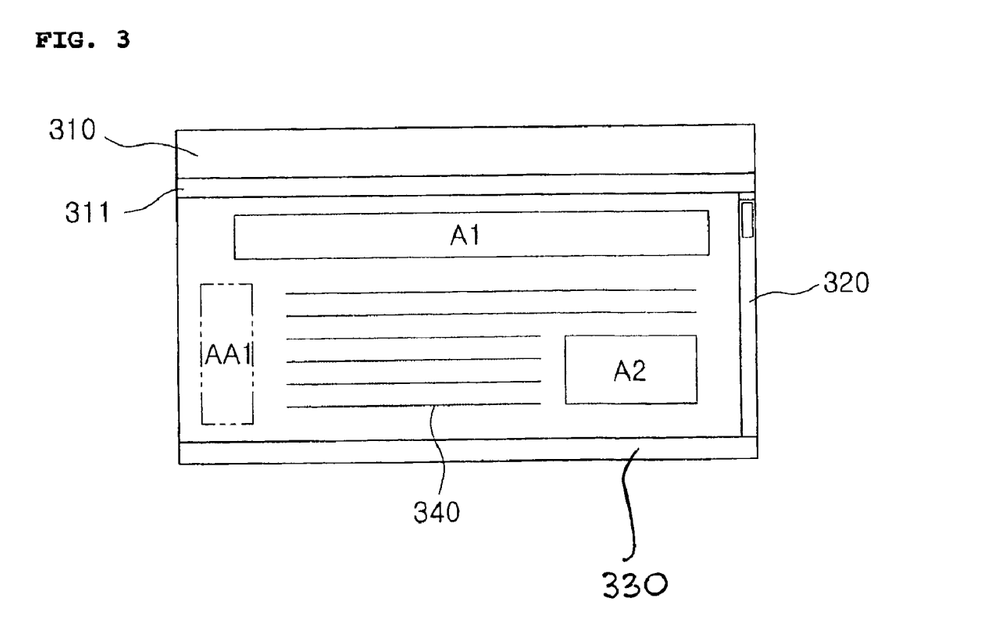
FIG. 3 is a diagram schematically showing a Web page displayed according to the present invention.

FIG. 3 is a diagram schematically showing a Web page displayed according to the preset invention. The Web page is described with reference to FIG. 3.

Referring to an Internet screen displayed on a terminal 20 through a Web browser, a menu bar & tool bar 310 and an address window 311 are sequentially arranged on the upper portion of the screen. A scroll bar 320 is placed on a right or left side of the screen to allow the Internet user to view an entire Web page while moving the scroll bar 320 upward or downward if the entire Web page cannot be displayed on a single screen. Meanwhile, a lower menu bar 330 is placed on the lower portion of the screen to provide basic information about the current Web page. A center portion surrounded by the menu bar & tool bar 310, the address window 311, the scroll bar 320 and the lower menu bar 330 is provided with a space in which the main content of the Web page is displayed. The space may include first and second advertisement parts A1 and A2, in which advertising content is to be placed, and an empty region, as well as a text part 340 in which target content intended by the corresponding Web page is placed.

In FIG. 3, an example in which a first additional advertisement part AA1 for new advertising content is formed in the empty region and is displayed through the terminal 20 is shown.

Figure 4:
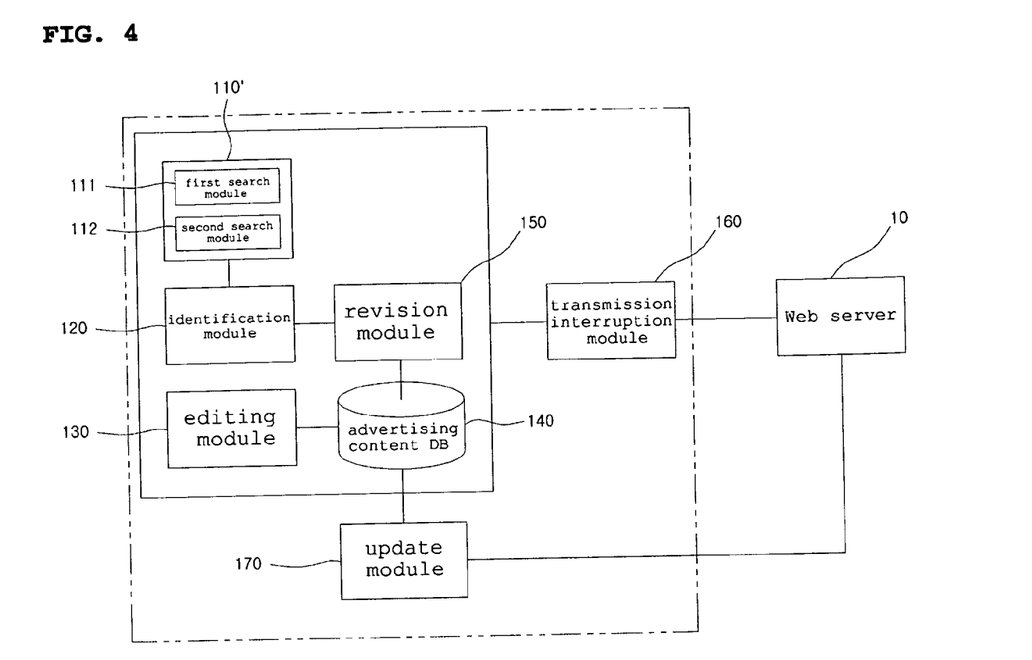
FIG. 4 is a block diagram of an advertising system according to a second embodiment of the present invention.

FIG. 4 is a block diagram of an advertising system according to a second embodiment of the present invention. The advertising system is described with reference to FIG. 4.

In the advertising system of the present invention, a location search module 110' includes first and second search modules 111 and 112. The first search module 111 operates source data transmitted from the Web server 10 and searches a certain space of a Web page in which no content is included. The second search module 112 searches the first and second advertisement parts A1 and A2 in which existing advertising content is arranged, as shown in FIG. 3.

The second search module 112 is used to replace existing advertising content that occupies a certain location in the current Web page, and to insert new advertising content into that location, thus allowing the Internet user to selectively view advertisements under a situation in which the Internet user must compulsorily view advertising content transmitted from the Web server 10 regardless of the requirements of the advertising content.

Meanwhile, the advertising content transmitted from the Web server 10 is an image file having a relatively large size (jpeg, jpg or gif). A slightly long time is required during a procedure of receiving the advertising content from the Web server 10. Therefore, if new advertising content is intended to be inserted into the first and second advertisement parts A1 and A2 in which existing advertising content exists, loading time caused by the transmission of an image file is shortened by interrupting the reception of the advertisement data, which is arranged in the location at which the existing advertising content is to be inserted, and, in addition, new advertising content stored in the advertising content DB 140 is inserted into the first and second advertisement parts A1 and A2.

A transmission interruption module 160 interrupts advertisement data of the existing advertising content transmitted from the Web server 10.

Generally, the transmission interruption module 160 preferably interrupts advertisement data of existing advertising content before the Web browser recognizes the advertisement data. Therefore, the transmission interruption module 160 must be arranged before the Web browser and primarily receive the source data from the Web server 10. Consequently, the Web browser recognizes that the downloading of existing advertising content to be arranged in the first and second advertisement parts A1 and A2 of the Web page has failed, so that the editing module 130 inserts new advertising content into the corresponding location.

Meanwhile, as described above, content that will occupy a predetermined space in the Web page at the time of configuring the Web page must have a size corresponding to that of the space, so as to be inserted into the space. Therefore, it is preferable to provide advertising content data having various sizes for the same advertising content, as described above. However, another embodiment of the present invention may further include a revision module 150 for arbitrarily adjusting the size of new advertising content to correspond to the location on the Web page. The revision module 150 is implemented by applying a thumbnail function generally used in a graphic processing program or graphic viewer program. It is apparent that the thumbnail function can be applied to the advertising system of the present invention. Because of the application of such a thumbnail function, there is no need to store new advertising content having various sizes corresponding to the sizes of insertion spaces in the advertising content DB 140 so as to insert the same advertising content into the Web page. Accordingly, storage capacity is saved and, additionally, the effort to unnecessarily produce the same advertising content having different sizes can be removed.

Since the advertising content DB 140 is placed in the terminal 20, it is difficult to update new information in real time. Therefore, it must be possible to update or delete advertising content previously stored in the advertising content DB 140 and additionally store new advertising content in the advertising content DB 140. For this operation, the advertising system of the present invention further includes an update module 170. The update module 170 automatically accesses the Internet at the same time the terminal 20 is turned on, thus performing an operation of updating required new advertising content or deleting advertising content. Generally, the amount of data updated by the update module 170 and stored in the advertising content DB 140 is somewhat large, so that it is preferable that an update operation be performed only when the Internet user stops using the terminal 20 for a while, or when the update module directly asks the user whether to update content and then approval is confirmed.

Meanwhile, the update module 170 may automatically access the Web server of a corresponding advertiser so as to update and receive data about new advertising content. Alternatively, a separate base station for locally providing advertising content may be installed, thus enabling the update module 170 to access the Web server of the base station while the base station is integrally operated regardless of advertisers.

In this case, the base station for providing the advertising content may be managed by the KT Corporation or Hanaro Telecom, which are Internet service providers, or a cable service provider connected to the Internet.

Moreover, as the Ministry of Information and Communication announces that a plan for constructing the Next Generation Convergence Network (NGcN) will extend and evolve into a Broadband convergence Network (BcN) including broadcasting and mobile Internet, it is expected that Digital Multimedia Broadcasting (DMB), which will soon be commercialized, and the mobile Internet can be newly added to a BcN strategy, in addition to an existing NGcN strategy indicating that a Digital Subscriber Line (DSL) network and a Hybrid Fiber Coaxial (HFC) network will be upgraded to a Fiber to the Premises (FTTH) network and a digital cable TV network.

This is realized by targeting the construction of a convergence network of broadcast communications and wired/wireless Internet. Therefore, it is expected that such a strategy will increase the utility of the advertising system and method according to the present invention, as the base station for providing advertising content is collectively applied to broadcast communications, wired/wireless Internet and mobile communications.

Figure 5:
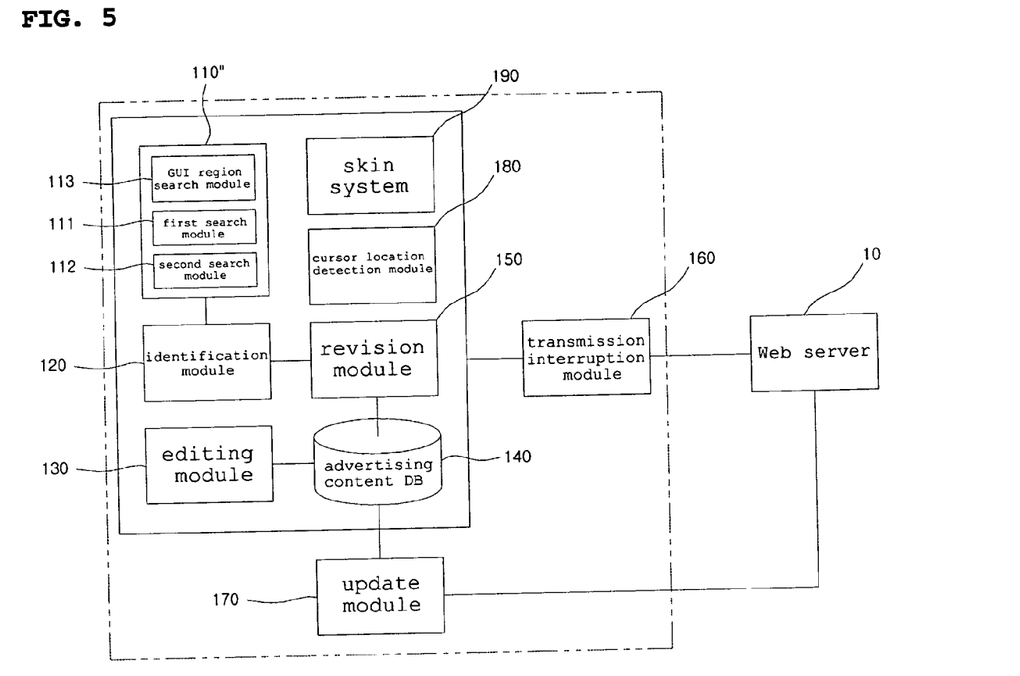
FIG. 5 is a block diagram of an advertising system according to a third embodiment of the present invention.
Figure 6:
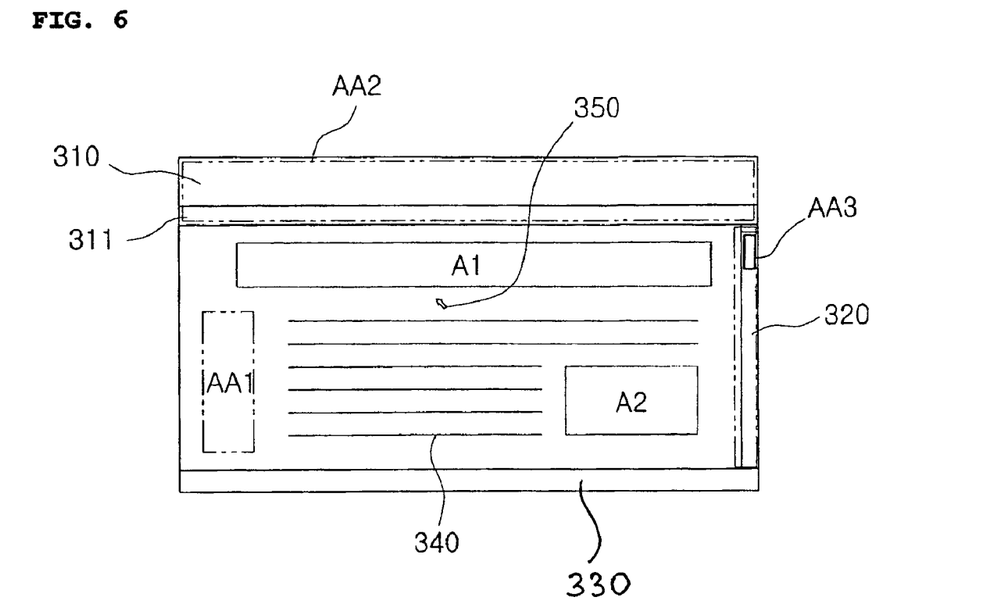
FIGS. 6 and 7 are diagrams schematically showing other examples of a Web page displayed according to the present invention.
Figure 7:
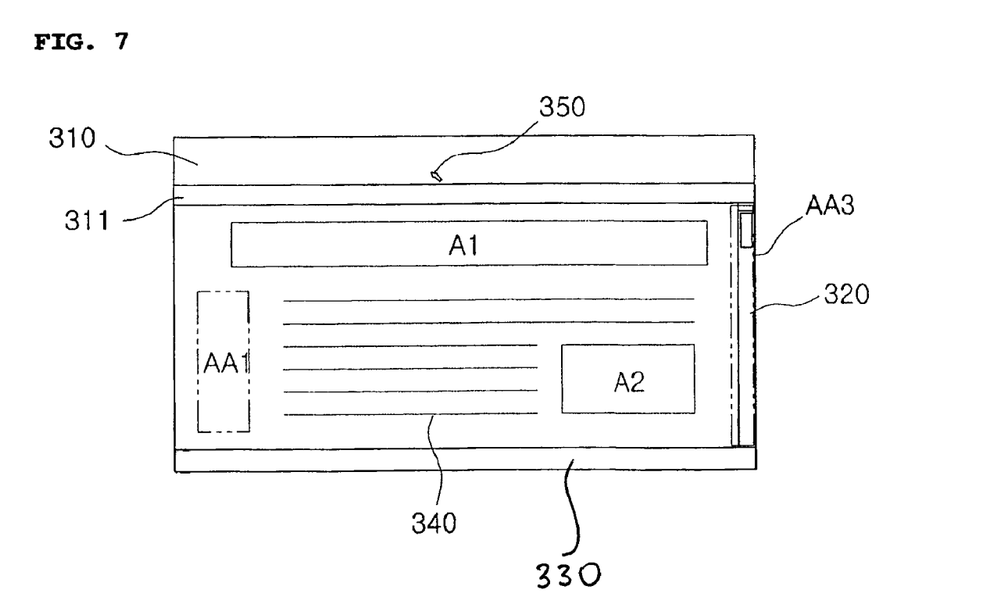

FIG. 5 is a block diagram of an advertising system according to a third embodiment of the present invention, and FIGS. 6 and 7 are diagrams schematically showing other examples of a Web page displayed according to the present invention. The advertising system and the Web page are described with reference to FIGS. 5 and 6 and 7.

The location search module 110 or 110' may further include a GUI region search module 113. As shown in FIGS. 6 and 7, the GUI region search module 113 searches an area, configuring a basic format required for an Internet user to manipulate a Web browser, such as a menu bar & tool bar 310, an address window 311, a scroll bar 320 or a lower menu bar 330, for a location into which new advertising content is to be inserted.

FIG. 6 illustrates an example in which a second additional advertisement part AA2 is inserted into the menu bar & tool bar 310 and/or the address window 311, and a third additional advertisement part AA3 is inserted into the scroll bar 320.

However, when new advertising content is placed in a GUI region, the Internet user inevitably feels inconvenienced when manipulating the GUI. Therefore, the advertising system of the present invention further includes a cursor location detection module 180 for detecting the movement location and current coordinates of a mouse cursor 350. Accordingly, if the mouse cursor 350 approaches the GUI, the cursor location detection module 180 senses the approach of the mouse cursor 350 and transmits a corresponding signal to the editing module 130. The editing module 130 eliminates new advertising content being currently displayed, and then restores the existing GUI.

FIG. 7 illustrates an example in which, when the mouse cursor 350 approaches the menu bar & tool bar 310 and the address window 311 in which the second additional advertisement part AA2 is inserted, the second additional advertisement part AA2 is eliminated and the original menu bar & tool bar 310 and the address window 311 are restored. Of course, in the scroll bar 320, which the mouse cursor 350 does not approach, the third additional advertisement part AA3 is maintained without being eliminated.

Meanwhile, the advertising system of the present invention further includes a skin system 190. The skin system 190 performs an operation of overlaying arbitrary content on a certain location on a Web page, without replacing various types of content constituting the Web page and completely changing the source code of the Web page. Therefore, when new advertising content is inserted into the empty region, the first and second advertisement parts A1 and A2, including existing advertising content, or the GUI, the skin system 190 provides a visual effect in which the new advertising content seems to be overlaid on the certain location, without creating and displaying a Web page in which the new advertising content is inserted, instead of the first and second advertisement parts A1 and A2 and the GUI that constitute the Web page.

By the application of the skin system 190, the new advertising content is overlaid on the existing GUI without being arranged instead of the GUI, and only a corresponding additional advertisement part AA2 or AA3 is eliminated if the mouse cursor 350 approaches the second or third additional advertisement part AA2 or AA3, thus allowing the GUI hidden under the additional advertisement part to be exposed.

Consequently, the unnecessary operation of the terminal executed to repeat elimination and insertion between the GUI and new advertising content is reduced, and the occupation of memory required to drive the Web browser is minimized, thus improving entire processing efficiency.

In addition, the skin system 190 can also be applied to the case where new advertising content is inserted into the empty region or the advertisement parts A1 and A2 in which existing advertising content was inserted. That is, when source data received through the Internet is operated/displayed as a complete Web page, a Web page is once completed based on the source data received from the Web server 10 and a skin method needs to be applied at the time of inserting new advertising content into the corresponding location found by the location search module 110, without requiring a procedure of editing the corresponding source data and changing the Web page itself so as to insert the new advertising content, thus reducing the time required for the Web browser to perform a task.

Figure 9:
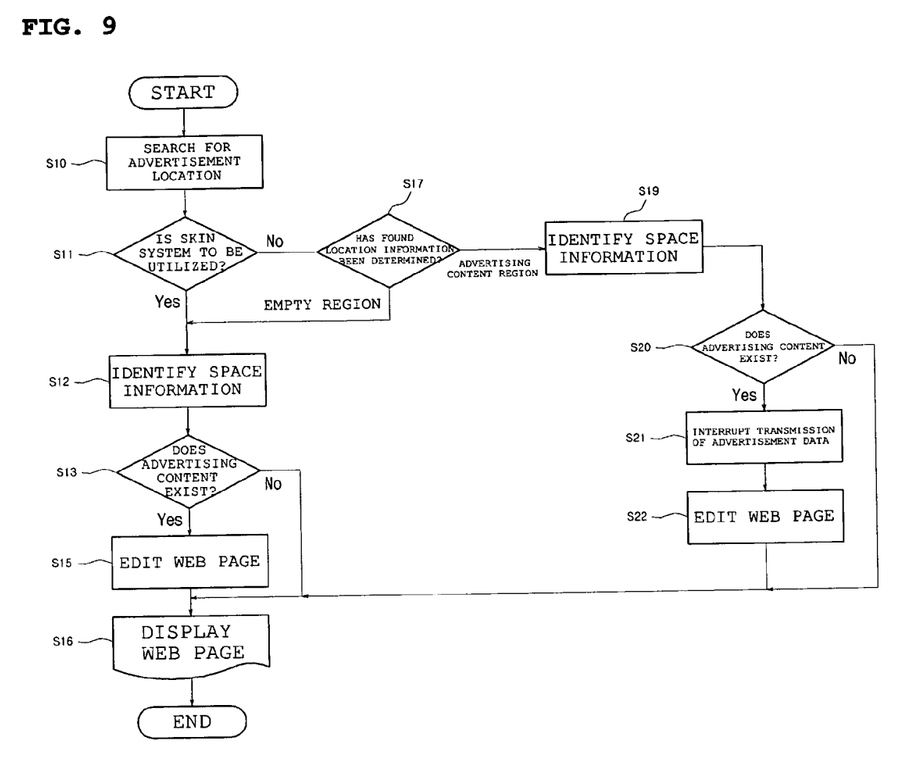
FIG. 9 is a flowchart of an advertising method according to a second embodiment of the present invention.

FIG. 9 is a flowchart of an advertising method according to a second embodiment of the present invention. The advertising method is described with reference to FIG. 9.

(1) Skin system operating step S11 of performing a revision to display new advertising content in a skin manner (overlaying manner) when the new advertising content is inserted into the location found at the advertisement location searching step S10

As described above, new advertising content is displayed in an overlaying manner at the time of inserting the new advertising content into a predetermined location on the Web page, without a need to revise the source code of the Web page when the Web browser creates the Web page. The advertising method of the present invention may utilize such a skin system 190, or not. If the skin system is not utilized, an operation of revising the predetermined location of the Web page found by the location search module 110 is performed in advance before the Web browser operates source data received from the Web server 10 and completes the Web page.

(2) Found location information determination step S17

If the location into which new advertising content is to be inserted has been found at the advertisement location searching step S10, it is determined whether the found location corresponds to an empty region, a region in which existing advertising content is placed, or a GUI region. Generally, the information determination step S17 is performed together at the advertisement location searching step S10. The found location information determination step S17 in FIG. 9 is performed to merely determine whether the location into which new advertising content is to be inserted is an empty region or an advertising content region. However, the found location information determination step S17 is not limited to the example of FIG. 9, but may also be performed to determine whether the insertion location is a GUI region, which will be described later.

(3) Space information identification step S19

This step is equal to the above-described space information identification step S12, so that a detailed description thereof is omitted.

(4) Advertising content searching step S20

This step is equal to the above-described advertising content searching step S13, so that a detailed description thereof is omitted.

(5) Advertisement data transmission interruption step S21 of interrupting the downloading of existing advertising content, which has been transmitted from the Web server 10 and is to be inserted into a corresponding advertising content region, when the location found at the advertisement location searching step S10 is the advertising content region If the skin system 190 is not utilized, the reception of existing advertising content is interrupted to insert new advertising content into the Web page. Through this operation, the time required for the Web browser to perform a task of completing and displaying the Web page can be reduced.

(6) Web page editing step S22

This step is equal to the above-described Web page editing step S15, so that a detailed description thereof is omitted.

Figure 10:
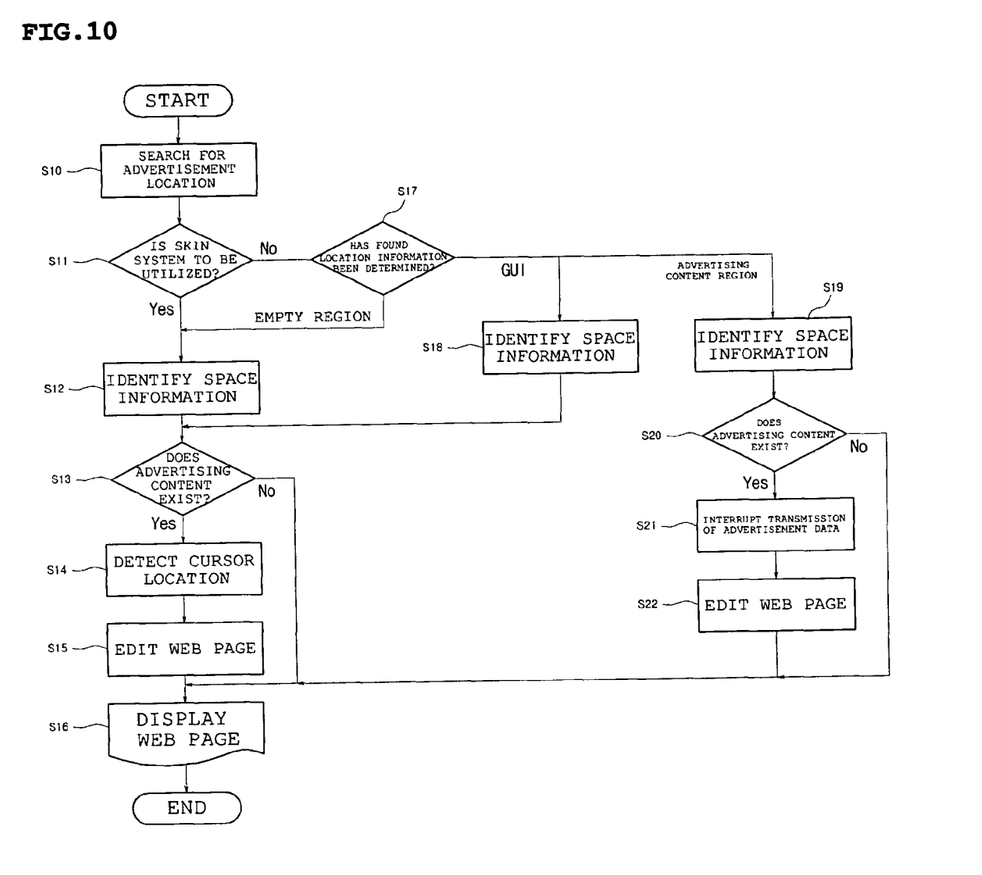
FIG. 10 is a flowchart of an advertising method according to a third embodiment of the present invention.

FIG. 10 is a flowchart of an advertising method according to a third embodiment of the present invention. The advertising method is described with reference to FIG. 10.

(1) Space information identification step S18

When the corresponding location is determined to be an empty region, a GUI region or an advertising content region at the found location information determination step S17, the size and coordinates of the GUI region are identified.

(2) Cursor location detection step S14 of reading the location of a mouse cursor and determining whether the mouse cursor is approaching the GUI region if the location found at the advertisement location searching step S10 corresponds to the GUI region When new advertising content is inserted into the GUI region, the location of the mouse cursor is detected regardless of whether to use the skin system 190, and the inserted new advertising content must be eliminated if the mouse cursor approaches the GUI region. Therefore, if the new advertising content is placed in the GUI region, a procedure of detecting the location of the mouse cursor is necessarily required regardless of whether to use the skin system 190.

Meanwhile, at the Web page editing step S15, if it is determined that the mouse cursor approaches the GUI region at the cursor location detection step S14, the inserted new advertising content is eliminated, and the corresponding GUI must be restored and displayed.

(3) Web page displaying step S16

If the editing of the Web page is completed, the Web browser displays the corresponding Web page through the display means of the terminal, and the Internet user can perform a required operation through the manipulation of the mouse or keyboard.

In the above-described embodiments of the present invention, content differently provided to respective client terminals through the arbitrary editing of the Web page are limited to advertisements. However, the Internet advertising method and system of the present invention can be applied to the transmission of content to provide useful information, such as educational information, stock information or weather information.

As described above, the present invention provides an Internet advertising method and system which inserts corresponding advertising content into a Web page and displays the Web page at the time of using the Internet, after separately transmitting advertising content suitable for personal features, such as the age or preference of Internet users, and storing the advertising content in an advertising content DB. Accordingly, the present invention can solve problems occurring in a conventional inefficient Internet advertising scheme that transmits uniform advertising content to a plurality of terminals connected to the same Web server, and can utilize small spaces generated in the Web page for advertisements in order to reduce advertisement costs.

Further, an advertiser can reduce a burden of paying a high price to an unpopular Web server for while enduring high risk and realize advertisements using various Web servers through only a single contract, thus greatly improving advertising effectiveness relative to advertisement costs in current advertisement markets abnormally concentrated on a specific Web server.

Further, a network service provider for providing Internet service can obtain profits in the Internet advertisement markets without constructing a separate Web site for providing Web services.

Further, through the construction of a broadband convergence network, such as BcN or NGcN, as the area of the Internet advertisement has extended to the advertisement market using broadcasting or mobile communications, as well as Internet advertisements using the Web server, the advertiser can unify advertisement procedures, which were separately conducted together with respective media, thus improving advertising effectiveness. Further, the Internet service provider increases profits from advertisements, thus providing services further improved from the aspects of quantity and quality, to Internet users, that is, consumers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An Internet advertising method, the advertising method being performed by a client terminal in communication with a Web server via the Internet, said method comprising:
   an advertisement location searching step of searching source data of a Web page transmitted from the Web server to the client terminal for a location on the Web page into which new advertising content is to be inserted;
   a space information identification step of identifying a size and coordinates of a found location;
   an advertising content searching step of searching, in an advertising content database that resides in the client terminal, for new advertising content corresponding to the identified location size and coordinates; and
   a Web page editing step of inserting found new advertising content into the found location on the Web page before a Web browser of the client terminal displays the Web page.

2. The Internet advertising method according to claim 1, wherein the advertisement location searching step is performed to search for an empty region of the Web page as the location into which the new advertising content is to be inserted.

3. The Internet advertising method according to claim 2, further comprising:
   a skin-system operating step of performing a revision to display the new advertising content overlaying the empty region of the Web page.

4. The Internet advertising method according to claim 1, further comprising:
   a cursor location detection step of reading a location of a mouse cursor of the client terminal and determining whether the mouse cursor is approaching a control region of a window of the Web browser;
   wherein
   the control region is located outside a periphery of a central region of the window where the Web page is to be displayed;

the control region includes at least one selected from the group consisting of a menu bar, a tool bar, a scroll bar, and a lower menu bar; and the Web page editing step is performed to
(i) cause the Web browser to display the inserted new advertising content in the control region when it is determined at the cursor location detection step that the mouse cursor does not approach the control region, and
(ii) eliminate the inserted new advertising content and restore and display the control region if it is determined that the mouse cursor approaches the control region at the cursor location detection step.

5. The Internet advertising method according to claim 4, further comprising:
a skin-system operating step of performing a revision to display the new advertising content overlaying the control region of the Web page when it is determined at the cursor location detection step that the mouse cursor does not approach the control region.

6. The Internet advertising method according to claim 1, wherein the advertisement location searching step is performed to search for advertising content already existing in the Web page as the location into which the new advertising content is to be inserted.

7. The Internet advertising method according to claim 6, further comprising:
an advertisement data transmission interruption step of interrupting downloading of existing advertising content from the Web server;
wherein the Web page editing step is performed to insert the found new advertising content into the Web page at the location of the existing advertising content.

8. The Internet advertising method according to claim 7, further comprising:
a skin-system operating step of performing a revision to display the new advertising content overlaying the existing advertising content of the Web page.

9. A client terminal connected to a Web server through the Internet and being configured as an Internet advertising system comprising:
a location search module for searching source data of a Web page transmitted from the Web server to the client terminal to be displayed by a Web browser of the terminal for a location on the Web page into which new advertising content is to be inserted;
an identification module for identifying a size and coordinates of the location found by the location search module;
an advertising content database (DB) for storing new advertising content; and
an editing module for analyzing the size and coordinates of the location obtained by the identification module, searching the advertising content DB for new advertising content corresponding to the analyzed location size and coordinates, and inserting found new advertising content into the found location on the Web page before the Web browser displays the Web page.

10. The client terminal being configured as an Internet advertising system according to claim 9, wherein the location search module comprises a first search module for searching an empty region of the Web page as the location into which the new advertising content is to be inserted.

11. The client terminal being configured as an Internet advertising system according to claim 10, further comprising:
a revision module for resizing the found new advertising content stored in the advertising content DB depending on the size and coordinates of the location identified by the identification module so that the resized new advertising content is fitted into the location of the Web page found by the location search module.

12. The client terminal being configured as an Internet advertising system according to claim 10, further comprising:
an update module for downloading new advertising content and updating the advertising content DB.

13. The client terminal being configured as an Internet advertising system according to claim 10, further comprising:
a skin system for displaying the new advertising content to overlay the empty region of the Web page.

14. The client terminal being configured as an Internet advertising system according to claim 10, wherein the location search module further comprises:
a second search module for searching for an existing advertising content region of the Web page as the location into which the new advertising content is to be inserted.

15. The client terminal being configured as an Internet advertising system according to claim 14, further comprising:
a revision module for resizing the found new advertising content stored in the advertising content DB depending on the size and coordinates of the location identified by the identification module so that the resized new advertising content is fitted into the location of the Web page found by the location search module.

16. The client terminal being configured as an Internet advertising system according to claim 14, further comprising:
an update module for downloading new advertising content and updating the advertising content DB.

17. The client terminal being configured as an Internet advertising system according to claim 14, further comprising:
a skin system for displaying the new advertising content to overlay the existing advertising content region of the Web page.

18. The client terminal being configured as an Internet advertising system according to claim 9, wherein:
the location search module further comprises a control region search module for searching a control region of a window of the Web browser,
the control region is located outside a periphery of a central region of the window where the Web page is to be displayed,
the control region includes at least one selected from the group consisting of a menu bar, a tool bar, a scroll bar, and a lower menu bar, and
the Internet advertising system further comprises a cursor location detection module for detecting coordinates of a current location of a mouse cursor of the client terminal on the Web page, and
the editing module is operable to
(i) cause the Web browser to display the inserted new advertising content in the control region when it is determined by the cursor location detection module that the mouse cursor does not approach the control region, and
(ii) eliminate the inserted new advertising content and restore and display the control region if it is determined by the cursor location detection module that the mouse cursor approaches the control region.

19. The client terminal being configured as an Internet advertising system according to claim 18, further comprising:
a revision module for resizing the found new advertising content stored in the advertising content DB depending on the size and coordinates of the location identified by the identification module so that the resized new advertising content is fitted into the location of the Web page found by the location search module.

20. The client terminal being configured as an Internet advertising system according to claim 18, further comprising:

an update module for downloading new advertising content and updating the advertising content DB.

21. The client terminal being configured as an Internet advertising system according to claim 18, further comprising:

a skin system for displaying the new advertising content to overlay the control region of the Web page when it is determined by the cursor location detection module that the mouse cursor does not approach the control region.

22. The client terminal being configured as an Internet advertising system according to claim 9, further comprising:

a revision module for resizing the found new advertising content stored in the advertising content DB depending on the size and coordinates of the location identified by the identification module so that the resized new advertising content is fitted into the location of the Web page found by the location search module.

23. The client terminal being configured as an Internet advertising system according to claim 9, further comprising:

an update module for downloading new advertising content and updating the advertising content DB.

* * * * *